(12) United States Patent
Shen et al.

(10) Patent No.: US 7,725,690 B2
(45) Date of Patent: May 25, 2010

(54) DISTRIBUTED DISPATCH WITH CONCURRENT, OUT-OF-ORDER DISPATCH

(75) Inventors: Gene W. Shen, San Jose, CA (US); Sean Lie, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 333 days.

(21) Appl. No.: 11/674,562

(22) Filed: Feb. 13, 2007

(65) Prior Publication Data
US 2008/0195846 A1  Aug. 14, 2008

(51) Int. Cl.
*G06F 9/00* (2006.01)
(52) U.S. Cl. ...................................... 712/220
(58) Field of Classification Search ................... 712/220
See application file for complete search history.

(56) References Cited

U.S. PATENT DOCUMENTS

| | | | |
|---|---|---|---|
| 5,664,136 A * | 9/1997 | Witt et al. ................ | 712/208 |
| 5,870,578 A | 2/1999 | Mahalingaiah et al. | |
| 6,032,249 A * | 2/2000 | Olson et al. ............... | 712/200 |
| 6,192,465 B1 | 2/2001 | Roberts | |
| 6,212,621 B1 | 4/2001 | Mahalingaiah | |
| 2004/0025146 A1 | 2/2004 | Kurihara | |

FOREIGN PATENT DOCUMENTS

| | | |
|---|---|---|
| EP | 1164472 | 12/2001 |
| WO | 2006/105295 | 10/2006 |

OTHER PUBLICATIONS

Patterson, David. Hennessy, John. "Computer Architecture, A Quantitative Approach". Morgan Kaufmann Publishers, Second Edition, 1996. pp. 251-261.*
U.S. Search Report for PCT/US2008/001924, mailed Jun. 10, 2008.

* cited by examiner

*Primary Examiner*—Eddie P Chan
*Assistant Examiner*—Robert Fennema
(74) *Attorney, Agent, or Firm*—Lawrence J. Merkel; Meyertons, Hood, Kivlin, Kowert & Goetzel, P.C.

(57) ABSTRACT

In one embodiment, a processor comprises an instruction buffer and a pick unit. The instruction buffer is coupled to receive instructions fetched from an instruction cache. The pick unit is configured to select up to N instructions from the instruction buffer for concurrent transmission to respective slots of a plurality of slots, where N is an integer greater than one. Additionally, the pick unit is configured to transmit an oldest instruction of the selected instructions to any of the plurality of slots even if a number of the selected instructions is greater than one. The pick unit is configured to concurrently transmit other ones of the selected instructions to other slots of the plurality of slots based on the slot to which the oldest instruction is transmitted. Some embodiments comprise a computer system including the processor and a communication device configured to communicate with another computer system.

18 Claims, 5 Drawing Sheets

Instruction Sequence

Speculative Program Order:
I0, I1, I2, I3, I4, I5, I6, I7, I8, I9, I10

| | Slot 0 | Slot 1 | Slot 2 |
|---|---|---|---|
| D0 | I0 | I1 | x |
| D1 | I3 | x | I2 |
| D2 | I6 | I4 | I5 |
| D3 | x | I7 | x |
| D4 | I9 | I10 | I8 |

Instruction Sequence

Speculative Program Order

I0
I1
I2
I3
I4
I5
I6
I7
I8
I9
I10

|     | Slot 0 | Slot 1 | Slot 2 |
|-----|--------|--------|--------|
| D0 | I0 | I1 | x |
| D1 | I2 | I3 | x |
| D2 | I4 | I5 | I6 |
| D3 | I7 | x | x |
| D4 | I8 | I9 | I10 |

Fig. 1
Prior Art

Instruction Sequence

Speculative Program Order
I0
I1
I2
I3
I4
I5
I6
I7
I8
I9
I10

|    | Slot 0 | Slot 1 | Slot 2 |
|----|--------|--------|--------|
| D0 | I0 | I1 | x |
| D1 | I3 | x | I2 |
| D2 | I6 | I4 | I5 |
| D3 | x | I7 | x |
| D4 | I9 | I10 | I8 |

Fig. 2

DISTRIBUTED DISPATCH WITH CONCURRENT, OUT-OF-ORDER DISPATCH

BACKGROUND

1. Field of the Invention

This invention is related to the field of processors and, more specifically, to fetch and dispatch of instructions in processors.

2. Description of the Related Art

Superscalar processors attempt to achieve high performance by processing multiple instructions in parallel. For example, superscalar processors typically include multiple parallel execution units, each configured to independently execute operations. In order to provide enough instructions to effectively make use of the parallel execution units, superscalar processor attempt to rapidly fetch and decode multiple instructions, and transmit them to the instruction scheduling mechanism.

Since operand dependencies between instructions need to be respected, the program order of the fetched and decoded instructions must be discernable so that dependency checking can be performed. For example, processors that implement register renaming often perform the dependency checking as part of the register renaming operation.

The program order of instructions transmitted in different clock cycles is typically apparent: instructions transmitted in earlier clock cycles are older than instructions transmitted in later clock cycles. An older instruction is prior to a younger instruction in the program order. The program order can be speculative, if branch prediction is implemented to direct fetching, for example.

Among instructions that are transmitted concurrently (e.g. in the same clock cycle), the program order is less apparent. To ensure that program order can be discerned, many processors assign a static program order among the parallel decoders. The decoders and other hardware can be viewed as slots to which instructions can be transmitted. The first instruction in program order is transmitted to slot 0, the second instruction in program order is transmitted to slot 1, etc. Thus, the program order of the concurrently transmitted instructions is apparent from the slots to which the instructions were transmitted.

FIG. 1 is an example of such operation for three slots (three concurrently transmitted instructions). Of course, any number of slots can be implemented. Also shown in FIG. 1 is an exemplary sequence of instructions I0 to I10, where the speculative program order of the instructions flows from top to bottom in FIG. 1 (e.g. I0 is first, I1 is second, etc., according to the speculative program order). For various reasons, less than three instructions are issued in some clock cycles (e.g. not enough instructions available from fetching, implementation-dependent constraints, etc.).

As illustrated in FIG. 1, the first instruction in program order in each transmission cycle (labeled D0 to D4 in FIG. 1) is always issued to slot 0. The second instruction in program order, if any, is always issued to slot 1 and the third instruction in program order, if any, is always issued to slot 2. Thus, the program order of the concurrently transmitted instructions is slot 0, then slot 1, and then slot 2.

Implementing instruction transmission in FIG. 1 typically includes a relatively complex rotation mechanism to align the first instruction in program order to slot 0. The rotation mechanism is dependent on the number of instructions previously transmitted and the location of the first instruction in the fetched instructions. Additionally, the resources associated with slot 0 are generally more highly utilized than other slots. If the slots are symmetrical in terms of resources, the resources assigned to slot 0 dictate the achievable parallelism of the processor as a whole. On the other hand, if more resources are assigned to slot 0 than the other slots (and more resources are assigned to slot 1 than slot 2), the implementation is more complex due to the differences between slots. Other proposed mechanisms permit the first instruction to be transmitted to a slot other than 0, but concurrently transmitted instructions are transmitted to higher-numbered slots. Thus, complex rotations are still used in such implementations.

SUMMARY

In one embodiment, a processor comprises an instruction buffer and a pick unit coupled to the instruction buffer. The instruction buffer is coupled to receive instructions fetched from an instruction cache. The pick unit is configured to select up to N instructions from the instruction buffer for concurrent transmission to respective slots of a plurality of slots, where N is an integer greater than one. Additionally, the pick unit is configured to transmit an oldest instruction of the selected instructions to any of the plurality of slots even if a number of the selected instructions is greater than one. The pick unit is configured to concurrently transmit other ones of the selected instructions to other slots of the plurality of slots based on the slot to which the oldest instruction is transmitted. Some embodiments comprise a computer system including the processor and a communication device configured to communicate with another computer system.

In an embodiment, a method comprises selecting up to N instructions from an instruction buffer in a processor for concurrent transmission to respective slots of a plurality of slots in the processor, wherein N is an integer greater than one; transmitting an oldest instruction of the selected instructions to any of the plurality of slots even if a number of the selected instructions is greater than one; and concurrently transmitting other ones of the selected instructions to other slots of the plurality of slots based on the slot to which the oldest instruction is transmitted.

BRIEF DESCRIPTION OF THE DRAWINGS

The following detailed description makes reference to the accompanying drawings, which are now briefly described.

FIG. 1 is a block diagram illustrating instruction transmission in one prior art form.

FIG. 2 is a block diagram illustrating one embodiment of instruction transmission as described herein.

Figure 3:
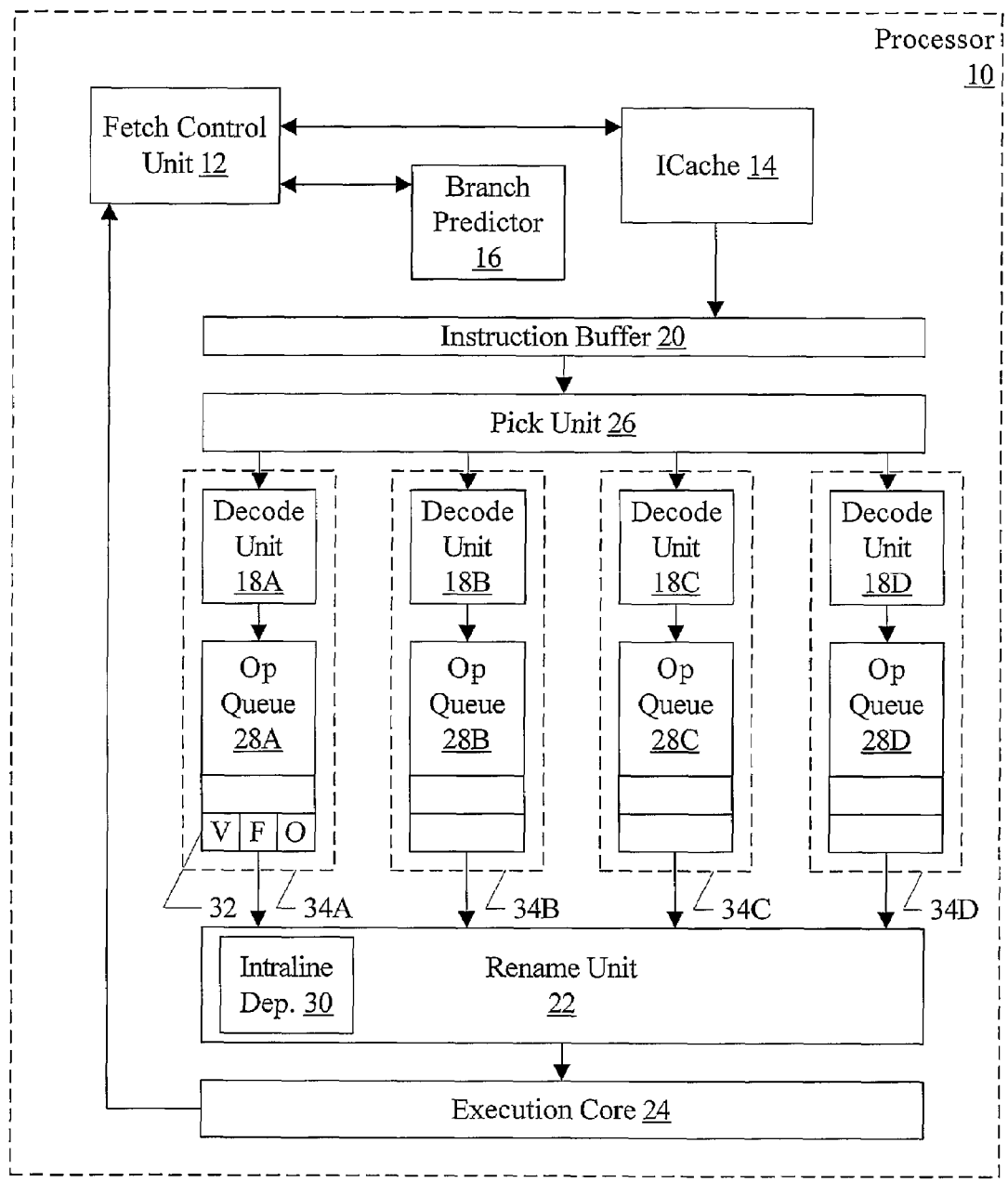
FIG. 3 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 2, a block diagram is shown illustrating instruction transmission according to one embodiment. A speculative instruction sequence is shown, comprising instructions I0 to I10. The numbering of the instructions indicates the speculative program order (e.g. instruction I0 is first in program order, instruction I1 is second in program order, etc.). Three slots are shown (slot 0, slot 1, and slot 2), and several consecutive cycles of instruction transmission are shown (D0 to D4). While three slots are shown for simplicity, it is noted that any number of slots may be implemented in various embodiments (e.g. 4 slots in FIG. 3). For comparison purposes, the same instructions are selected in each of the cycles D0 to D4 as are shown in FIG. 1. Various reasons for selecting less than three instructions in a given cycle may exist (e.g. the number of instructions that have been fetched but not yet transmitted to a slot; implementation-specific constraints on the concurrent transmission of instructions such as detection and prediction of branch instructions, the number of instructions in a given set of fetched instruction bytes, etc.; etc.).

According to the instruction selection mechanism described herein, the oldest instruction in program order may be transmitted to any slot, independent of the number of instructions concurrently selected for transmission (e.g. even if the number of instructions is greater than one). The other selected instructions may be transmitted to slots based on the slot to which the oldest instruction is transmitted. For example, the slots may be considered as consecutive to each other, including wrap around from the last slot to slot 0. That is, in the illustrated embodiment, slot 1 is consecutive to slot 0, slot 2 is consecutive to slot 1, and slot 0 is consecutive to slot 2. If the oldest instruction is transmitted to a given slot, the subsequent instructions are transmitted to consecutive slots to that given slot. The oldest instruction in a given transmission may be identified in some fashion, so that downstream pipeline stages may discern the program order.

By transmitting the oldest instruction to any slot, the load of instructions on downstream resources may be relatively balanced over time. Accordingly, symmetrical resources may be provided without significantly impacting performance, in some embodiments. Implementation may thus be eased. For example, one instance of the slot hardware may be designed, and the instance may be replicated to provide the desired slots. Additionally, instructions may be fetched (e.g. into an instruction buffer) and transmitted with less, or perhaps no, rotation to align them from the buffer to the slot to which they are transmitted, in some embodiments.

In FIG. 2, the oldest instruction in any given cycle is transmitted to the slot that is consecutive to the last slot filled in the previous transmission (i.e. the slot filled with the youngest instruction in the previous transmission). I0 and I1 are selected and are transmitted to slots 0 and 1 in cycle D0. In cycle D1, instructions I2 and I3 are selected. Since I1 was transmitted to slot 1, and was the youngest instruction in cycle D0, instruction I2 is transmitted to slot 2. Instruction I3 is transmitted to the next consecutive slot (slot 0). In cycle D2, three instructions are selected (I4, I5, and I6). Instruction I4 is transmitted to slot 1, and the remaining instructions are transmitted to the consecutive slots (I5 to slot 2, and I6 to slot 0). In cycle D3, instruction I7 is selected and transmitted to slot 1; and in cycle D4, instructions I8, I9, and I10 are selected and transmitted to slots 1, 2, and 0 respectively.

While FIG. 2 illustrates three slots, other embodiments may include more than three slots or two slots. For example, FIG. 3 illustrates an embodiment having 4 slots 34A-34D.

Each slot comprises hardware to which a fetched instruction may be transmitted and within which the fetched instruction remains until exiting the last pipeline stage of the slot. The slots may be independent of each other, and their pipelines may be stall-free. In one embodiment, each slot may comprise at least decoder circuitry, and may further comprising any additional desired circuitry prior to beginning out of order execution (e.g. prior to a scheduling stage at which instructions are scheduled for execution). For example, in FIG. 3, each slot may comprise a decode unit and an operation (op) queue.

Turning now to FIG. 3, a block diagram of one embodiment of a processor 10 is shown. In the illustrated embodiment, the processor 10 comprises a fetch control unit 12, an instruction cache (ICache) 14, a branch predictor 16, an instruction buffer 20, a pick unit 26, a plurality of decode units 18A-18D, a plurality of op queues 28A-28D, a rename unit 22, and an execution core 24. The fetch control unit 12 is coupled to the ICache 14, the branch predictor 16, and the execution core 24. The ICache 14 is further coupled to the instruction buffer 20, which is coupled to the pick unit 26. The pick unit 26 is coupled to the decode units 18A-18D, which are each coupled to a respective op queue 28A-28D. The op queues 28A-28D are coupled to the rename unit 22. The rename unit 22 is further coupled to the execution core 24 and includes an intraline dependency checker 30.

The term operation, or instruction operation, (or more briefly "op") will be used herein with regard to instructions executed by the processor 10. Generally, an operation may comprise any operation that execution resources within the processor 10 may execute. Operations may have a one-to-one mapping to instructions specified in an instruction set architecture that is implemented by the processor 10. The operations may be the same as the instructions, or may be in decoded form. Alternatively, instructions in a given instruction set architecture (or at least some of the instructions) may map to two or more operations. In some cases, microcoding may be implemented and the mapping may comprise a microcode routine stored in a microcode read-only memory (ROM). In other cases, hardware may generate the operations, or a combined approach of hardware generation and microcoding may be used. Thus, branch operations (or more briefly "branches") correspond to, or are derived from, branch instructions. Load operations and store operations (or more briefly "loads" and "stores") correspond to, or are derived from, load and store instructions or other instructions having a memory operand. Similarly, other operations may correspond to, or be derived from, other instructions.

The fetch control unit 12 is configured to generate fetch addresses to fetch instructions for execution in the processor 10. The fetch control unit 12 is coupled to the branch predictor 16, and uses the branch predictions generated by the branch predictor 16 to control subsequent fetching, thus generating a speculative program order. Additionally, refetch flush controls may be provided by the execution core 24 for redirecting fetching when a refetch flush occurs (e.g. branch misprediction, other misspeculation, or exception). The fetch control unit communicates fetch addresses to the ICache 14, which provides corresponding instruction bytes to the instruction buffer 20.

The pick unit 26 may scan the instruction bytes in the instruction buffer 20 to locate instructions for transmission to the slots (beginning with the decode units 18A-18D). In one embodiment, the ICache 14 may implement predecode to facilitate the location of instructions within the fetched bytes. For example, variable byte length instructions sets like x86 (also known as IA-32) or AMD64™ may have instruction boundaries at varying points within the bytes. The pick unit 26 may use the predecode data to locate instructions and may select the instruction bytes that correspond to each located instruction to transmit to the decode units 18A-18D. The pick unit 26 may enforce various implementation constraints on the concurrently selected instructions as well. Exemplary constraints for some embodiments may include one or more of the following: a limit on the number of branch instructions; a limit on the number of dynamic execution resources such as scheduler queue entries or free registers for register renaming; a limit on instruction types which can be dispatched concurrently in the same group; etc.

In one embodiment, the pick unit 26 may scan instruction bytes as they are written to the instruction buffer 20, identifying instructions and assigning them to slots. The pick unit 26 may, for example, assign consecutive slots to consecutive instructions in the program order, rotating from the last slot back to slot 0. As the instructions are selected, they may be transmitted to the assigned slot. Thus, slot selection may be independent of the number of instructions selected in a given clock cycle. In another embodiment, the pick unit 26 may record the slot consecutive to the slot filled by the youngest instruction in each cycle (e.g. by slot number), and may transmit the oldest instruction selected in the next clock cycle to that recorded slot number. Subsequent instructions selected in the same next clock cycle may be transmitted to consecutive slots, and the slot consecutive to the youngest instruction may again be recorded. Other embodiments may use other mechanisms to determine which slots receive which instructions.

The pick unit 26 may also be configured to generate an indication of the oldest instruction in a given concurrent transmission of instructions. For example, the slot number of the oldest instruction may be provided, or a flag bit may be set in the slot receiving the oldest instruction. Any indication may be used.

Each decode unit 18A-18D comprises circuitry to decode an instruction provided by the pick unit 26, generating an operation. The decode units may include a microcode unit, if microcoding is implemented. The decode unit 18A-18D provides the operation to the op queue 28A-28D coupled to that decode unit 18A-18D. Each op queue 28A-28D comprises a plurality of entries, each entry configured to store an op. If a given slot has no op transmitted to it in a given cycle, but other slots do have ops transmitted, an entry may be allocated in the op queue 28A-28D and the entry may indicate invalid. Thus, the group of concurrently transmitted instructions may remain together in the same entry in each op queue 28A-28D, and may be read by the rename unit 22 concurrently. Thus, a given group of concurrently transmitted instructions may exit the slots at the same time.

Each op queue entry may store an op and various status/control data. For example, an op queue entry 32 is shown in the op queue 28A. Other entries may be similar. The op queue entry 32 may include a valid bit (V), a first bit (F), and an op field (O). Other status/control data may be implemented in various embodiments as well. The valid bit may indicate whether or not the entry is valid. That is, the valid bit may indicate whether or not the entry is currently storing an op. The first bit may indicate whether or not the op corresponds to the oldest instruction in the group of concurrently transmitted instructions. Alternatively, one or more entries may store a slot number indicating the oldest instruction. In one embodiment, the op queue entries may also include predecode data to accelerate processing of the instructions.

The rename unit 22 may implement the register renaming. The rename unit 22 may maintain a mapping of logical registers to physical registers, and may rename each source logical register to a physical register based on the mapping. The rename unit 22 may also assign a free physical register to each destination register, and may rename the destination registers with the newly assigned physical registers. The rename unit 22 may update the mapping to reflect the newly assigned physical registers. Generally, the logical registers may include any architected registers specified by the instruction set architecture implemented by the processor 10, as well as implementation-specific programmer-visible registers and microcode temp registers, if any. Physical registers may comprise the registers actually implemented in the processor 10. The rename unit 22 provides the operations and their renames to the execution core 24.

As part of the renaming process, the rename unit may check for dependencies between the operations concurrently provided from the op queues 28A-28D. The first bits from the op queue entries may be used to locate the oldest instruction, to order the instruction for dependency checking in the intra-line dependency checker 30. The rename unit 22 may also provide the first bit or other indication of the instruction order to the execution core 24.

The execution core 24 may include scheduling circuitry (e.g. centralized scheduler, reservation stations, etc.) to schedule operations for execution when their operands are available. The execution core 24 may represent one or more parallel execution units that execute various operations. For example, various embodiments of the execution core 24 may comprise one or more integer units, one or more address generation units (for load/store operations), one or more floating point units, and/or one or more multimedia units, a data cache, etc. The execution core 24 may also include exception detection hardware, and retirement hardware to retire instructions that are no longer speculative and have executed correctly.

Each of the ICache 14 and the data cache in the execution core 24 may comprise any configuration and capacity, in various embodiments. In some embodiments, the ICache 14 may also store predecode data, such as instruction start and/or end indicators to identify the locations of instructions.

In some embodiments, the processor 10 may support multithreading. For example, an embodiment may have shared instruction cache and decode hardware, but may have separate per-thread execution clusters. It is noted that, while the illustrated embodiment includes 4 slots (decode units and op queues), other embodiments may include any number of 2 or more slots.

In one embodiment, the predecode scheme implemented in the ICache 14 may include two end bits associated with each instruction byte, one end bit included in each of two sets of end bits. If a byte is not the end of an instruction, both bits may be cleared. If the byte is the end of an instruction, at least one of the end bits may be set. The sets of end bits may be generated so that consecutive instructions in a sequence have their set end bit in opposite ones of the sets. In such an embodiment, the pick unit 26 may comprise two scanners, each receiving one of the sets of end bits. Each scanner may locate the first two instruction ends indicated in their respective sets of bits. Thus, up to four instructions maybe located using only find first and find second algorithms on the end bits. In one embodiment, instructions that decode into one or two ops are handled in hardware in the decode units 18A-18D and instructions that decode into three or more ops are handled in microcode. Instructions that are decoded to two ops may be referred to as double dispatch ops. Double dispatch ops may have both end bits set, so that the instruction is transmitted to two slots. One of the instruction instances may be tagged as the second instance, and the two receiving decode units 18A-18D may generate the respective first or second op for that instruction.

Figure 4:
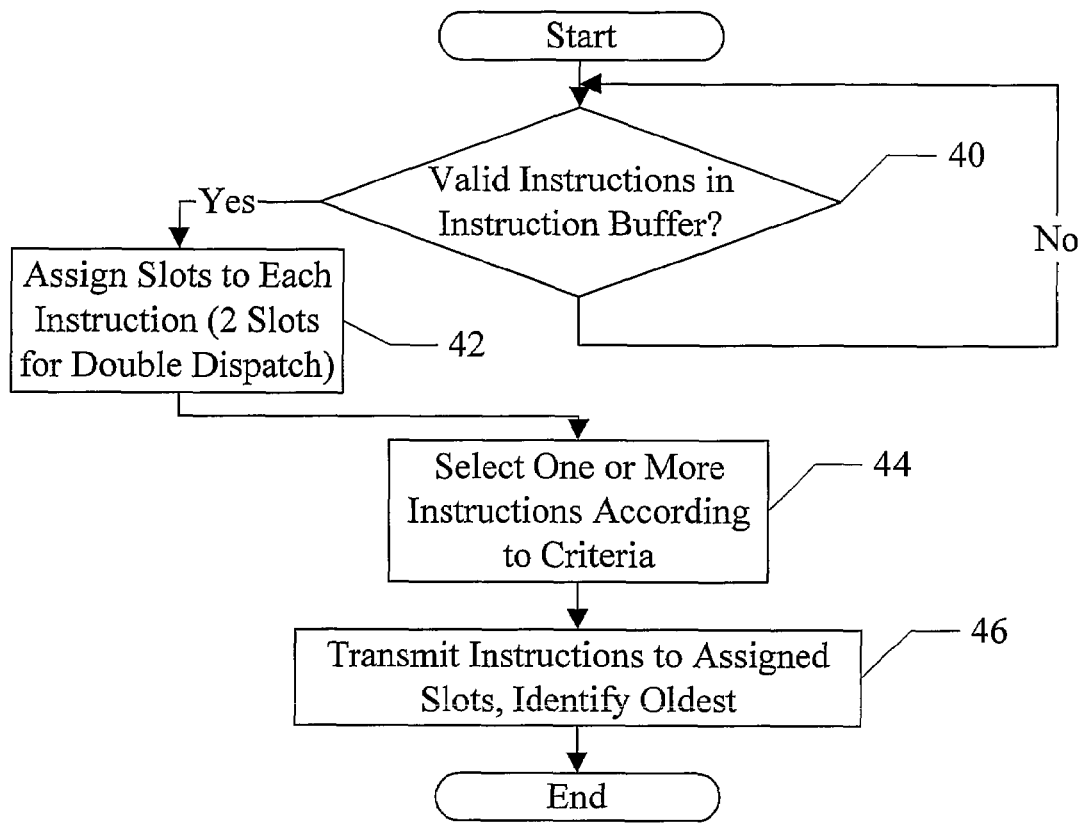
FIG. 4 is a flowchart illustrating operation of one embodiment of a pick unit.

Turning now to FIG. 4, a flowchart illustrating operation of one embodiment of the pick unit 26 is shown. While the blocks are shown in a particular order for ease of understanding, other orders may be used. Blocks may be performed in parallel by combinatorial logic in the pick unit 26. Blocks, combinations of blocks, and/or the flowchart as a whole may be pipelined over multiple clock cycles.

If valid instructions (instruction bytes) are in the instruction buffer 20 (decision block 40, "yes" leg), the pick unit 26 may assign slots to each instruction (block 42). If an instruction is double dispatch, in one embodiment, the instruction may be assigned 2 slots. If the are no valid instructions in the instruction buffer 20, the pick unit 26 may await valid instructions (decision block 40, "no" leg).

The pick unit 26 may select one or more instructions according to various criteria, some of which may be implementation dependent in various embodiments (block 44). The pick unit 26 may transmit the instructions to the assigned slots, and may identify the oldest instruction (block 46).

Figure 5:
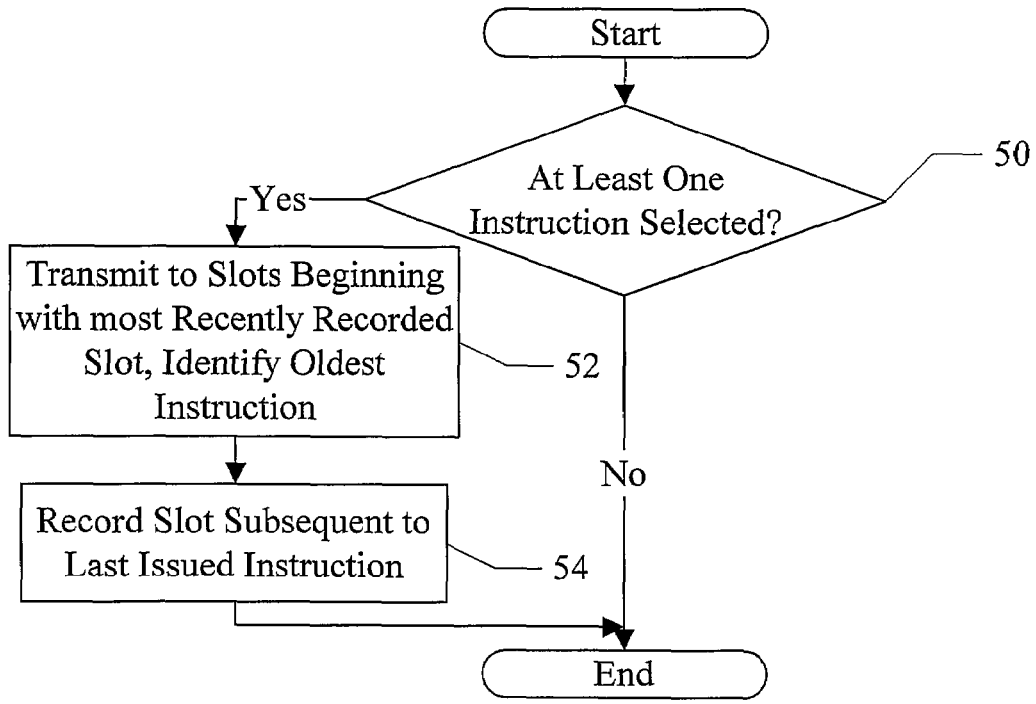
FIG. 5 is a flowchart illustrating operation of another embodiment of a pick unit.

Turning now to FIG. 5, a flowchart illustrating operation of another embodiment of the pick unit 26 is shown. While the blocks are shown in a particular order for ease of understanding, other orders may be used. Blocks may be performed in parallel by combinatorial logic in the pick unit 26. Blocks, combinations of blocks, and/or the flowchart as a whole may be pipelined over multiple clock cycles.

The pick unit 26 may attempt to select instructions to transmit. If at least one instruction is selected (decision block 50, "yes leg"), the pick unit 26 is configured to transmit the instructions to slots beginning with the most recently recorded slot and continuing with consecutive slots (block 52). The pick unit 26 may also identify the oldest instruction. The pick unit 26 may also record the slot corresponding to the last issued instruction (block 54).

Figure 6:
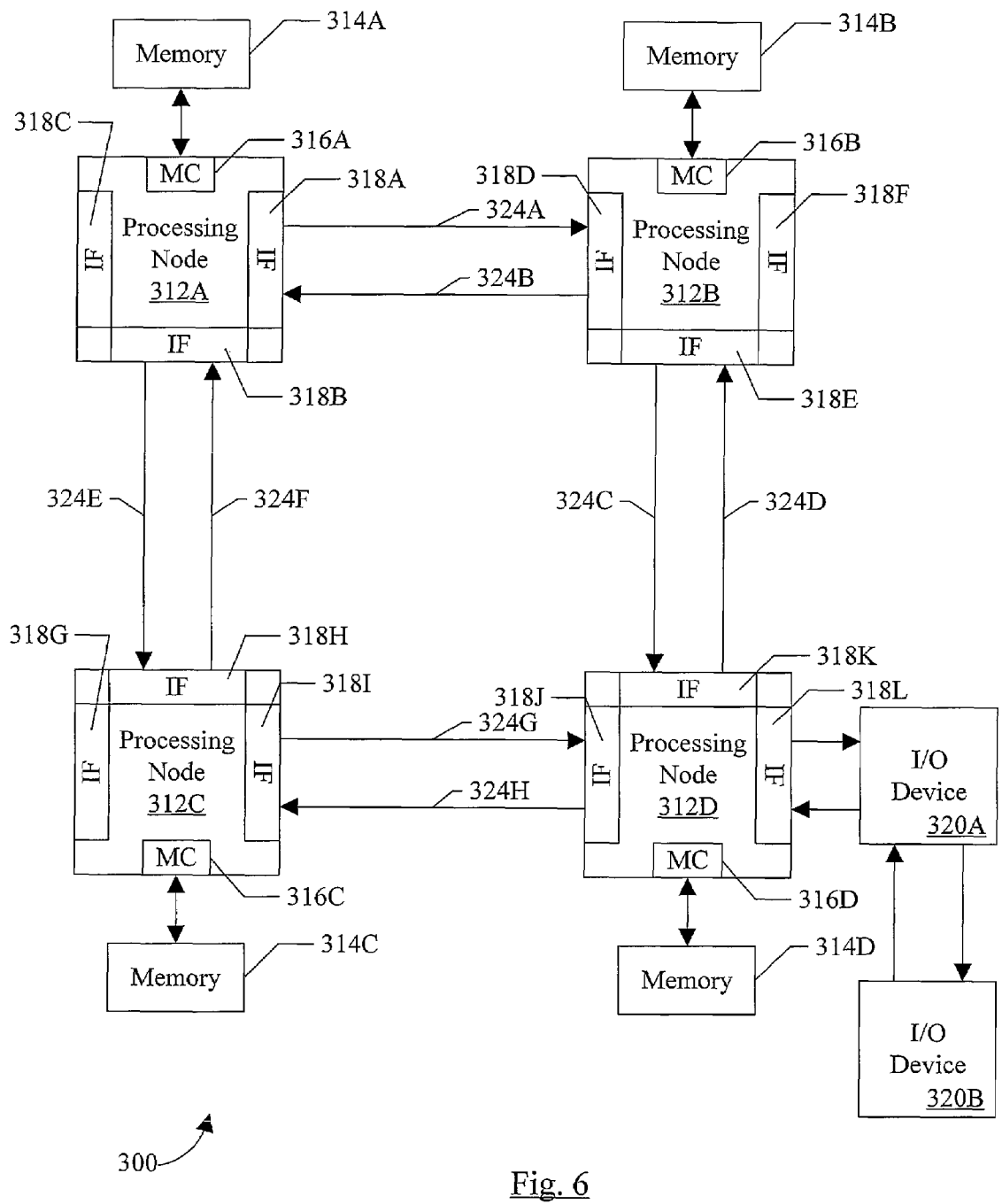
FIG. 6 is a block diagram of one embodiment of a computer system.

Turning now to FIG. 6, an embodiment of a computer system 300 is shown. In the embodiment of FIG. 6, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 6. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 6. Any suitable routing algorithm may be used. Other embodiments of computer system 300 may include more or fewer processing nodes then the embodiment shown in FIG. 6.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 3 (e.g. including various structural and operational details shown in FIGS. 2 and 4-5). One or more processors may comprise a chip multiprocessing (CMP) or chip multithreaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Furthermore, one or more processors 10 may be implemented in a more traditional personal computer (PC) structure including one or more interfaces of the processors to a bridge to one or more I/O interconnects and/or memory.

Numerous variations and modifications will become apparent to those skilled in the art once the above disclosure is fully appreciated. It is intended that the following claims be interpreted to embrace all such variations and modifications.

What is claimed is:

1. A processor comprising:
    an instruction buffer coupled to receive instructions fetched from an instruction cache; and
    a pick unit coupled to the instruction buffer and configured to select up to N instructions from the instruction buffer for concurrent transmission to respective slots of a plurality of symmetrical slots, each of the plurality of symmetrical slots having a same set of hardware resources as each other one of the plurality of symmetrical slots, wherein N is an integer greater than one, and wherein the pick unit is configured to transmit an oldest instruction of the selected instructions to any of the plurality of slots even if a number of the selected instructions is greater than one, and wherein the pick unit is configured to transmit the oldest instruction of the selected instructions to a selected slot of the plurality of slots in a first clock cycle even if the number of the selected instructions is greater than one in the first clock cycle, and wherein the pick unit is configured to concurrently transmit other ones of the selected instructions to other slots of the plurality of slots based on the selected slot to which the oldest instruction is transmitted, wherein the selected slot in the first clock cycle is a next consecutive slot to a second slot to which a youngest instruction from a preceding set of up to N instructions from the instruction buffer was transmitted during a preceding clock cycle, and wherein the pick unit is configured to select the selected slot as the next consecutive slot responsive to the youngest instruction having been transmitted to the second slot in the preceding clock cycle.

2. The processor as recited in claim 1 wherein the pick unit is configured to assign instructions to slots in response to receiving the instructions into the instruction buffer.

3. The processor as recited in claim 2 wherein the pick unit is configured to assign the instructions to consecutive slots according to the program order of the instructions in the instruction buffer.

4. The processor as recited in claim 2 wherein the selected slot is the assigned slot of the oldest instruction of the selected instructions, and subsequent instructions are assigned to consecutive slots.

5. The processor as recited in claim 1 wherein the pick unit is configured to record the selected slot responsive to transmitting the youngest instruction to the second slot.

6. The processor as recited in claim 1 wherein each slot of the plurality of slots comprises a decode unit.

7. The processor as recited in claim 6 wherein each slot further comprises a queue coupled to the decode unit and configured to store decoded operations provided by the decode unit.

8. The processor as recited in claim 7 wherein the pick unit is configured to identify the oldest instruction, and wherein the queue is configured to store an indication identifying the oldest instruction in each set of concurrently selected instructions.

9. The processor as recited in claim 8 further comprising a rename unit coupled to the queues in the plurality of slots and configured to read one of the concurrently selected instructions from each of the queues, wherein the rename unit is configured to perform register renaming on the concurrently selected instructions and is configured to use the indication of the oldest instruction to detect register dependencies among the concurrently selected instructions.

10. A method comprising:
    selecting up to N instructions from an instruction buffer in a processor for concurrent transmission to respective slots of a plurality of symmetrical slots in the processor, each of the plurality of symmetrical slots having a same set of hardware resources as each other one of the plurality of symmetrical slots, wherein N is an integer greater than one;
    transmitting an oldest instruction of the selected instructions to any of the plurality of slots even if a number of the selected instructions is greater than one, and wherein the transmitting of the oldest instruction of the selected instructions is to a selected slot of the plurality of slots in a first clock cycle even if the number of the selected instructions is greater than one in the first clock cycle, and wherein the selected slot is a next consecutive slot to a second slot to which a youngest instruction from a preceding set of up to N instructions from the instruction buffer was transmitted during a preceding clock cycle, and wherein the transmitting to the selected slot as the next consecutive slot is responsive to the youngest instruction having been transmitted to the second slot in the preceding clock cycle; and
    concurrently transmitting other ones of the selected instructions to other slots of the plurality of slots based on the slot to which the oldest instruction is transmitted.

11. The method as recited in claim 10 further comprising assigning instructions to slots in response to receiving the instructions into the instruction buffer.

12. The method as recited in claim 11 wherein the assigning comprises assigning the instructions to consecutive slots according to the program order of the instructions.

13. The method as recited in claim 10 further comprising recording the selected slot responsive to transmitting the youngest instruction to the second slot.

14. The method as recited in claim 10 wherein the processor includes a plurality of decode units and a plurality of queues, wherein each of the plurality of queues is coupled to a respective decode unit of the plurality of decode units, and wherein each decode unit and its respective queue comprise a slot, the method further comprising each of the plurality of queues storing decoded operations provided by the respective decode unit.

15. The method as recited in claim 14 wherein transmitting the oldest instruction further comprises identifying the oldest instruction, and the method further comprising a corresponding queue of the plurality of queues storing an indication identifying the oldest instruction in each set of concurrently selected instructions.

16. The method as recited in claim 15 further comprising:
   reading one of the concurrently selected instructions from each of the plurality of queues;
   using the indication of the oldest instruction to detect register dependencies among the concurrently selected instructions.

17. The method as recited in claim 16 further comprising performing register renaming on the concurrently selected instructions.

18. A computer system comprising:
   a processor comprising:
      an instruction buffer coupled to receive instructions fetched from an instruction cache; and
      a pick unit coupled to the instruction buffer and configured to select up to N instructions from the instruction buffer for concurrent transmission to respective slots of a plurality of symmetrical slots, each of the plurality of symmetrical slots having a same set of hardware resources as each other one of the plurality of symmetrical slots, wherein N is an integer greater than one, and wherein the pick unit is configured to transmit an oldest instruction of the selected instructions to any of the plurality of slots even if a number of the selected instructions is greater than one, and wherein the pick unit is configured to transmit the oldest instruction of the selected instructions to a selected slot of the plurality of slots in a first clock cycle even if the number of the selected instructions is greater than one in the first clock cycle, and wherein the pick unit is configured to concurrently transmit other ones of the selected instructions to other slots of the plurality of slots based on the selected slot to which the oldest instruction is transmitted, wherein the selected slot is a next consecutive slot to a second slot to which a youngest instruction from a preceding set of up to N instructions from the instruction buffer was transmitted during a preceding clock cycle, and wherein the pick unit is configured to select the selected slot as the next consecutive slot responsive to the youngest instruction having been transmitted to the second slot in the preceding clock cycle; and
   a communication device configured to communicate between the computer system and another computer system.

\* \* \* \* \*